United States Patent [19]

Glickman

[11] 4,353,663
[45] Oct. 12, 1982

[54] DETACHABLE CONNECTOR FOR STRUCTURAL MEMBERS AND METHOD OF INSTALLATION

[75] Inventor: Joel I. Glickman, Huntington Valley, Pa.

[73] Assignees: Conroy, Inc., San Antonio, Tex.; Magic Mold Corporation, Southhampton, Pa.

[21] Appl. No.: 156,101

[22] Filed: Jun. 3, 1980

[51] Int. Cl.³ .......................... B25G 3/00; F16B 7/08; F16B 9/00
[52] U.S. Cl. .................... 403/230; 403/231; 403/407
[58] Field of Search ............... 403/230, 231, 245, 406, 403/407

[56] References Cited

U.S. PATENT DOCUMENTS

| | | | |
|---|---|---|---|
| 3,580,535 | 5/1971 | Naske | 248/239 |
| 4,047,822 | 9/1977 | Lehmann | 403/187 |
| 4,060,949 | 12/1977 | Busse | 403/294 |
| 4,127,353 | 11/1978 | Busse | 403/245 |
| 4,163,618 | 8/1979 | Giovanetti | 403/245 |

*Primary Examiner*—Wayne L. Shedd
*Attorney, Agent, or Firm*—Kilpatrick & Cody

[57] ABSTRACT

A two piece detachable connector for joining furniture components at right angles comprising a pin and a holding piece, and method of installation. The pin has a head, a neck, a radial shoulder to limit insertion into a bore hole in a first furniture component and an insertion shank having annular fins to retain the pin in the bore hole. The holding piece has a recess to receive the pin head, neck and radial shoulder, a portion of which recess is arcuate and forms a constriction to removably capture the neck of the pin. The holding piece also has sharp, relatively deep annular fins to engage the wall of a bore hole in a second furniture component while permitting limited lateral displacement of the holding piece within the bore hole to accommodate inaccuracies in the relative locations of the bore holes in the furniture components. The pin and holding piece have camming surfaces that cooperate to effect mating engagement during assembly of connector parts. The holding piece may be installed in a bore hole located slightly back from the abutting surface of the furniture member in which it is installed so that the holding piece is slightly displaced during mating of connector parts, thereby bringing the furniture components into tight abutting contact and causing the holding piece annular fins firmly to engage the wall of the bore hole in which the holding piece is disposed.

14 Claims, 7 Drawing Figures

DETACHABLE CONNECTOR FOR STRUCTURAL MEMBERS AND METHOD OF INSTALLATION

BACKGROUND OF THE INVENTION

This invention relates to a connector for detachable connection of two structural members, such as two plate-shaped furniture components to be joined at right angles. Connector parts are secured to structural members and are engageable when brought together so that the structural members are securely held together.

Detachable fittings or connectors are generally known and used in the furniture industry. Such connectors permit simple detachable connection of furniture components, making possible delivery of furniture unassembled with consequent savings in space and transportation expenses. Known connectors typically include a pin or stud which is inserted in a prepared hole in a furniture sidewall and is removably inserted in a holding piece in a second furniture component at right angles to the furniture sidewall so that the pin supports the weight of the second component, which may be a furniture top panel, floor, intermediate floor or shelf.

Typical of known approaches to the provision of detachable connectors for furniture are the following United States Letters Patent:

| U.S. Pat. No. | Issued | Inventor |
| --- | --- | --- |
| 4,163,618 | August 7, 1979 | Giovannetti |
| 4,127,353 | November 28, 1978 | Busse |
| 4,060,949 | December 6, 1977 | Busse |
| 3,580,535 | May 25, 1971 | Naske |

Giovannetti discloses a plastic joint for furniture comprising a holding piece with a shank for fastening in a slot of a first furniture part and a head removably engageable with a pin projecting from a second furniture part. The pin is seated in the head from above and captured by a pin clamping cover which is seated in the head after the parts are joined. Limited lateral misalignment between the pin and head are accommodated by the width of the area in the head which receives the pin. The Giovannetti connector is more complex and difficult to connect than the present invention, more readily visible in use and permits lateral movement of the furniture members after connection. It also requires complex machining operations to prepare the furniture members for installation of the connector parts.

Busse U.S. Pat. No. 4,127,353 ('353) discloses a two-piece connector having a holding piece and expansion dowel, the head of which dowel is removably captured by the holding piece. An alternative embodiment of '353 employs as a third connector part, a covering cap, to lock the head in the holding piece. This connector is also more complex, and therefore difficult and expensive to manufacture, than the present invention, is more difficult to connect and disconnect, does not disclose the novel means of the present invention for removably capturing one connector part by the other, and cannot accommodate lateral misalignment between connector parts.

Busse U.S. Pat. No. 4,060,949 ('949) discloses a connector having a single piece holding piece and pin which is installed with an anchoring screw. Such connector requires the use of a tool for installation and accordingly does not permit the rapid assembly and disassembly of furniture members afforded by the present invention. Furthermore, '949 cannot accommodate misalignment of the connector-receiving holes bored in furniture members as can the present invention. Naske discloses a two-piece connector for furniture comprising a cup-shaped holding piece and a pin.

The Naske connector cannot accommodate lateral misalignment of connector parts, does not disclose the novel means for removably connecting connector parts disclosed by the present invention, and employs a different means for retaining the holding piece in the bore hole in which it is disposed.

As is recognized by Giovannetti, one problem frequently encountered in the manufacture of furniture of the type employing such connectors is inaccuracy in location of connector parts in the furniture components and variations in spacing of like connector parts in a single furniture component which parts must mate with connector parts in a second furniture component. Such inaccuracies and variations result, for instance, from inaccuracies in location of bore holes for receipt of connector parts which result from inherent inaccuracies in equipment and techniques utilized in the production of such furniture and dimensional instability of materials, such as particle board and wood, commonly used in furniture construction.

Another problem well recognized in the prior art is the need to design a connector for detachable connection of furniture components which will removably lock together to provide for tight interconnection of furniture components while permitting simple assembly and disassembly without the use of tools.

It is therefore an object of the present invention to provide a connector for the detachable connection of two structural members which abutt perpendicularly to each other, which connector can accommodate variations in location of the connector parts within structural members and consequent initial mismatching of mating connector parts in assembly of the members.

An additional object of the present invention is to provide a connector with parts which will detachably or removeably lock together permitting simple connection of structural members during assembly of such members without the use of tools.

A further object of the present invention is to provide a connector permitting simple and inexpensive mounting of the connector parts on structural members without the use of glue.

Further objects include provision of a connector which provides: sufficiently strong connection of structural members to withstand stress reasonably to be anticipated in assembly, disassembly, reassembly and utilization of the assembled structure; tight interconnection of structural members with firm pressing of such members against each other in their connected state; easy disassembly and reassembly of structural members; and secure, permanent installation of fitting parts in structural members.

A further object of the present invention is to provide a connector which is simple and inexpensive to manufacture while accommodating the constraints inherent in the applicable manufacturing techniques available.

A further object of the present invention is to provide a method for installing pin and holding piece connector parts which facilitates tight interconnection of structural members with firm pressing of such members against each other in their connected state.

A final object of the present invention is to provide a method for installing pin and holding piece connector parts which insures that mating of connector parts firmly locks the holding piece in the bore hole in which it is disposed.

SUMMARY OF THE INVENTION

The objectives of the invention are achieved by a detachable connector for connection of two structural members such as components of furniture butting together at right angles, for example a furniture sidewall and furniture top panel, floor, intermediate floor or shelf.

The present invention provides a D-shaped holding piece adapted for insertion in a bore hole in a first structural member and a stud or pin adapted for partial insertion in a bore hole in a second structural member such that the exposed portion of the pin may be inserted into and removably captured by the D-shaped holding piece.

Both connector parts are provided with annular fins to engage the sidewalls of bore holes made in the structural members to be connected. Such fins are sharp and relatively deep such that a force or lateral thrust applied on either connector member, particularly the holding piece, tending to displace such member perpendicular to the axis of the bore hole in which such member is disposed will press the fins into a portion of the wall of the bore hole, thereby permitting relatively substantial lateral displacement of the connector part within the bore hole without dislodgment of the part from the bore hole. This displacement of connector parts during their connection or mating accommodates inaccuracies in initial relative location of the parts within structural members by permitting the parts to move relative to their respective structural members as the parts are connected.

BRIEF DESCRIPTION OF THE DRAWINGS

The invention is now explained in detail by means of the drawings in which.

DESCRIPTION OF THE PREFERRED EMBODIMENT

Figure 1:
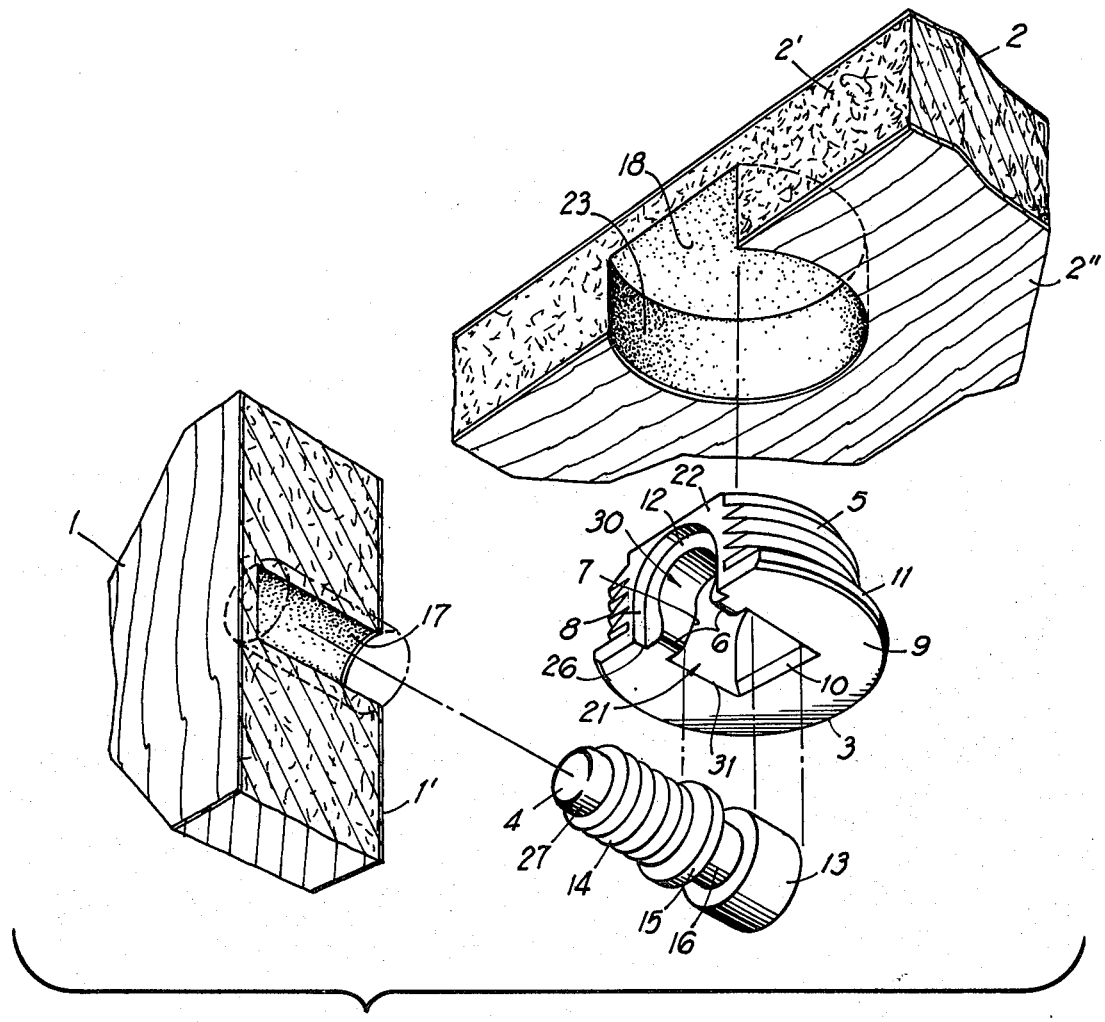
FIG. 1 is a perspective exploded view seen from below of a connector according to the invention together with partial views of two flat plate-shaped structural members.

In the FIGS., 1 and 2 are flat structural members, as for instance a furniture bottom, top or shelf and a sidewall which are to be connected with each other in such a manner that the abutting surface 2' of structural member 2 rests against or abuts surface 1' of structural member 1 so that the structural members 1 and 2 when connected to each other extend at right angles to each other. The connection is achieved by a connector which consists of a holding piece 3 and a pin 4 which serves as a connecting piece.

Figure 4:
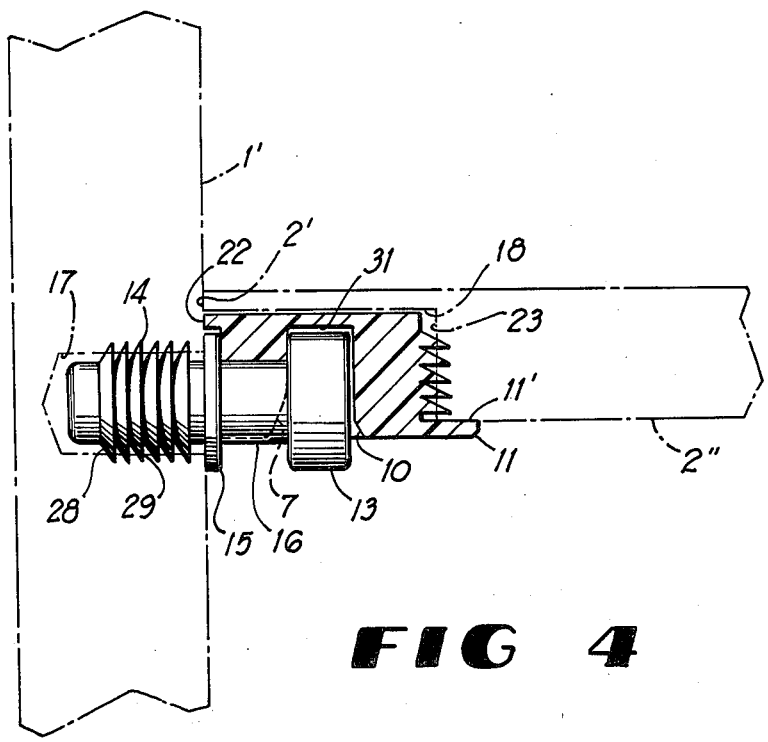
FIG. 4 is a section taken along lines 4—4 in FIG. 3 through the holding piece showing the pin in full.

The pin 4 has an insertion shank 27 with annular fins 14, a radial shoulder 15, neck 16 and head 13. In use, shank 27 of the pin 4 is inserted in a blind or through bore hole 17 in abutting surface 1' of structural member 1 until radial shoulder 15 contacts abutting surface 1' of structural member 1, thereby insuring insertion to the correct depth regardless of the depth of bore hole 17. Annular fins 14 engage the wall of bore hole 17 to hold pin 4 in place. As is shown in FIG. 4, the leading surfaces 28 of annular fins 14 are sloped to facilitate insertion of the pin while trailing surfaces 29 of fins 14 are perpendicular to the axis of the pin. Thus, during insertion of the pin, the fins distort slightly and/or deform the wall of the bore hole 17 to permit insertion but resist removal of the pin by engagement of the wall of bore hole 17, thereby locking the pin in place, resisting its removal.

Figure 6:
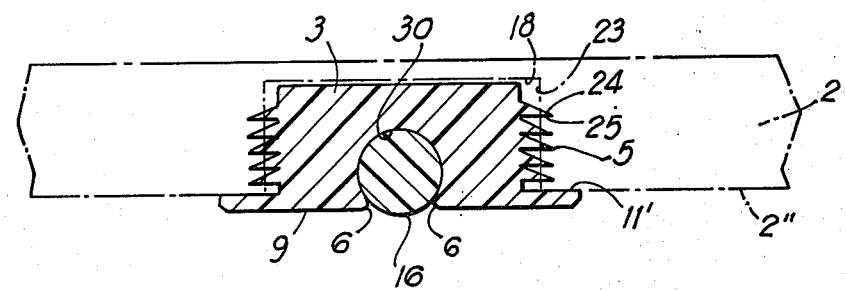
FIG. 6 is a section taken along lines 6—6 in FIG. 3 through the connector at the pin neck.

The holding piece 3 is D-shaped with an outside surface having a semi-circular portion and a flattened face 22. The flattened face 22 is operable to lie co-planar with the abutting surface 2' of structural member 2 when the holding piece 3 is installed in bore hole 18 and the connector parts are joined. The semi-circular portion of holding piece 3 has sharp, relatively deep annular fins 5 which engage wall 23 of bore hole 18. Referring to FIG. 6, the upper surface 24 of each fin 5 slopes to facilitate insertion of the holding piece into the bore hole while the lower surface 25 of each fin is perpendicular to the axis of the bore hole along which the holding piece is moved during insertion. Thus, during insertion of the holding piece, the fins distort slightly and/or deform wall 23 of bore hole 18 to permit insertion but resist removal of the holding piece by engagement of wall 23 of the bore hole 18, thereby locking the holding piece in place. Additionally, the relatively large projection of the fins 5 and the acute angle formed by surfaces 24 and 25 of the fins, producing a sharp edge, cooperate with the wall 23 of bore hole 18 to maintain positive engagement of the holding piece in the bore while permitting some lateral displacement of the holding piece in any direction on a plane perpendicular to the axis of the bore.

Holding piece 3 also has a flange 11 of radius greater than that of the edge of the annular fins 5, which flange acts as a stop as is shown in FIG. 4 to limit the depth of insertion of holding piece 3 into bore hole 18 of structural member 2. Contact of the top surface 11' of flange 11 with the bottom surface 2" of structural member 2 also contributes to the support of structural member 2.

Figure 2:
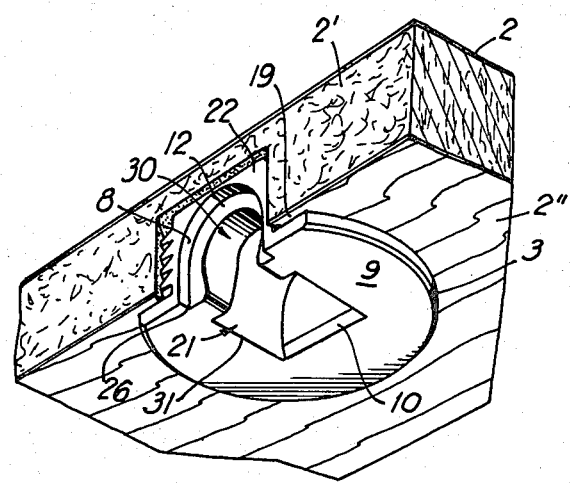
FIG. 2 is a perspective view of the holding piece of the connector installed in a blind bore hole in a structural member.
Figure 7:
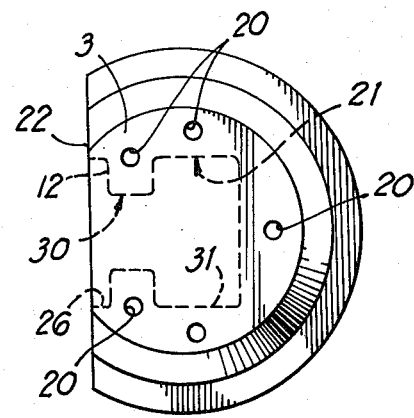
FIG. 7 is a top plan view of the holding piece of the connector.

Holding piece 3 has a recess 21, shown in FIGS. 1 and 2 and by a dashed line in FIG. 7, adapted to receive the head 13, neck 16 and radial shoulder 15 of pin 4, comprising a U-shaped channel 26, an arcuate portion 30 and a U-shaped cavity 31.

The U-shaped channel 26, shown in FIGS. 1 and 2, for receiving radial shoulder 15 of pin 4 is defined by substantially parallel walls 8 which are spaced apart a distance substantially equal to the diameter of the radial shoulder 15 of the pin and are adjacent to surface 12, which is recessed from flattened face 22 a distance substantially equal to the thickness of the radial shoulder 15.

The arcuate portion 30, shown in perspective in FIGS. 1 and 2 and in cross section in FIG. 6, which removably captures the neck 16 of pin 4, is defined by a substantially semi-circular opening through surface 12 of the holding piece of substantially the same diameter as neck 16 of pin 4, the side of which opening is open toward bottom surface 9 of the holding piece, forming a constriction defined by rounded surfaces 6, which constriction is slightly narrower than the diameter of neck 16 of pin 4.

Figure 3:
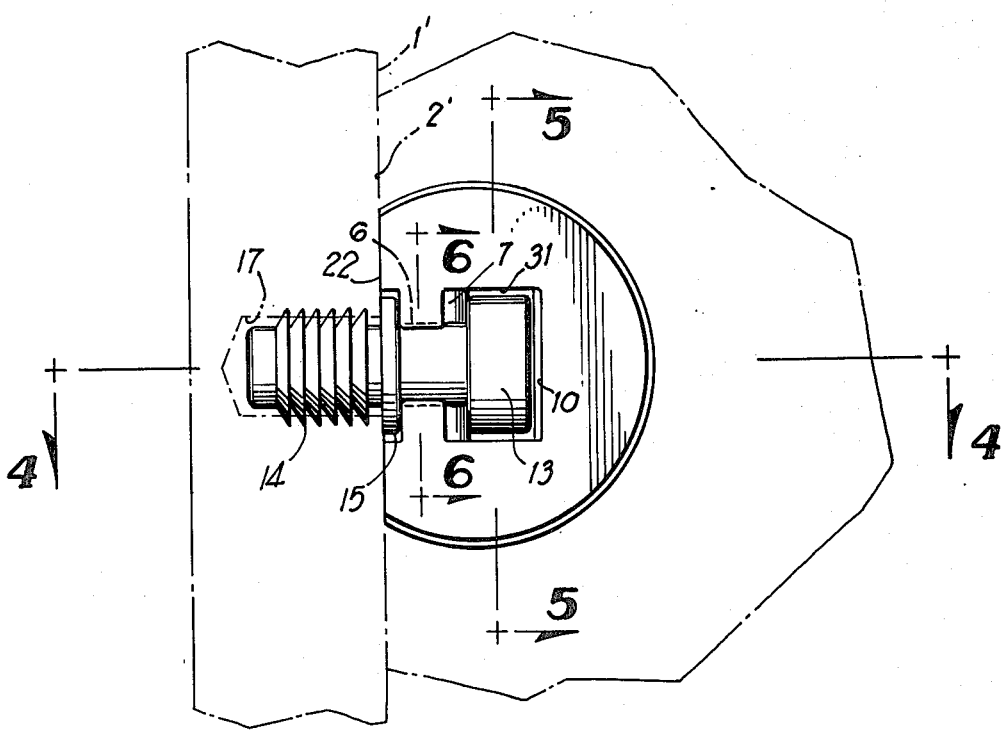
FIG. 3 is a view from below showing the connector in place in perpendicular butting structural members indicated by dashed lines.
Figure 5:
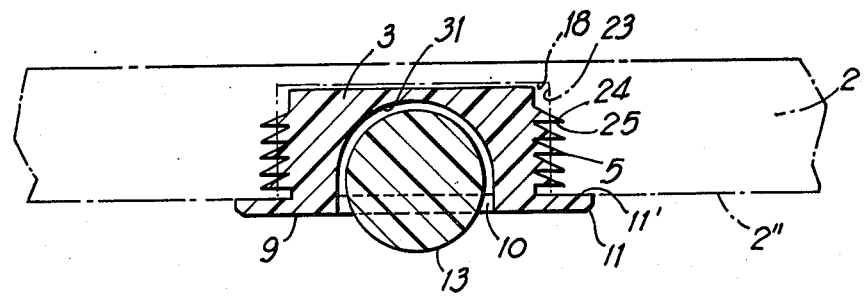
FIG. 5 is a section taken along lines 5—5 in FIG. 3 through the connector at the pin head.

As shown in FIGS. 3 and 4, the U-shaped cavity 31, which receives and is substantially occupied by head 13 of the pin 4 has obliquely sloping walls 7, shown on FIGS. 1, 3 and 4, adjacent to the arcuate portion 30 of the recess 21 to engage the head 13 of the pin and, upon sliding movement of the abutting surfaces 1' and 2' of the structural members during mating of the connector parts, to displace the holding piece 3 toward the abutting surfaces as the pin head 13 follows the obliquely sloping walls 7 of the cavity.

All surfaces and edges of pin 4 and holding piece 3 which make initial contact during insertion of pin 3 into holding piece 4 are sloping, chamfered or rounded, or contact sloping, chamfered or rounded surfaces such that the head 13 and neck 16 of pin 4 will be lead into recess 21 of the holding piece during mating of the connector parts. As is shown on FIGS. 1 and 3, such surfaces include, specifically, chamfer 10, obliquely sloping walls 7 and rounded surfaces 6. Other surfaces and edges of holding piece 3 which are not rounded, sloping or chamfered, contact rounded surfaces of pin 4 and thus also cooperate to lead pin 4 into engagement with holding piece 3 during mating of the connector parts.

During manufacture of furniture utilizing the invention, holding piece 3 is inserted in a bore hole 18 in structural member 2, which bore hole may be blind as shown or a through bore. The bore hole 18 is located such that a segment of its circumference falls outside the plane of abutting surface 2' of structural member 2. Ideally, the bore hole 18 is so located that, upon insertion of holding piece 3, flattened face 22 of holding piece 3 is initially recessed slightly behind abutting surface 2' of structural member 2, as shown in FIG. 2 by exposed area 19 of bottom surface 2' of structural member 2. Upon subsequent assembly of structural members 1 and 2 and mating of the connector parts, holding piece 3 is displaced (as hereinafter more fully described) within bore 18 toward abutting surface 2' along an axis perpendicular to the plane of structural member abutting surface 2' such that holding piece flattened face 22 and structural member surface 2' become substantially co-planar as shown in FIGS. 3 and 4.

Connection of connector parts which have been previously inserted in structural members is accomplished by lowering holding piece 3 onto the head 13 and neck 16 of pin 4. If the holding piece has been inserted in bore 18 such that flattened face 22 is recessed slightly behind abutting surface 2' of structural member 2 as shown in FIG. 2, and the axis of the arcuate portion 30 of the recess 21 for receipt of neck 16 of the pin 4 is directly above the axis of the pin, the first contact the pin will make with the holding piece will be contact of head 13 with obliquely sloping walls 7 of the holding piece. Minor misalignment of the holding piece and pin will result in alternative or additional contact between other surfaces of the holding piece and pin, but the above described chamfered, sloping or rounded surfaces will tend to lead the pin into the holding piece. Application of downward force on structural member 2 will cause obliquely sloping walls 7 of the holding piece, which acts as a camming surface, to slide against head 13 of the pin displacing the holding piece within bore 18 of structural member 2 and bringing abutting surface 2' of structural member 2 into tight abutting contact, as shown in FIGS. 3 and 4, with abutting surface 1' of structural member 1 as the constriction formed by rounded surfaces 6 of the holding piece is forced beyond the greatest width of neck 16 of the pin 4 and the neck 16 is received and removably captured by the arcuate portion 30 of the recess 21 in the holding piece 3.

Connector parts 3 and 4 may be manufactured of any material having suitable properties of strength, durability, economy, and appearance, so long as the geometry of neck 16 of pin 4 or the constriction formed at arcuate portion 30 by rounded surfaces 6 of holding piece 3 can resiliently change to permit connection, disconnection, and reconnection of the connector parts. Suitable material for connector parts has been found to be nylon for the pin and "ABS" (acylonitrile butadiene styrene) for the holding piece. The pin could also be made of metal. If the holding piece is made of plastic, it is desirable to mold the holding piece with blind holes 20, which may be round as shown in FIG. 7 or of any suitable shape to produce areas of relatively uniform thickness in the holding piece 3, to reduce distortion of surfaces of the holding piece by shrinkage of the plastic material from which it is produced during curing or cooling of such material.

In the preferred embodiment of the invention the pin 4 is approximately 1 inch (25.4 millimeters) in length and 0.280 inches (7.1 millimeters) in diameter at the neck 16, with a head 13 of 0.46 inches (11.68 millimeters) in diameter. The annular fins 14 on the pin 4 are 0.047 inches (1.2 millimeters) in depth, measured on trailing surfaces 29 of the fins. The pin 4 is injection molding of nylon in a multiple cavity tool.

In the preferred embodiment, the holding piece 3 is approximately 1.2 inches (30.5 millimeters) in diameter at the flange 11 and approximately 0.43 inches (10.9 millimeters) thick. The annular fins 5 are approximately 0.095 inches (2.4 millimeters) deep, measured on lower surfaces 25 of the annular fins 5. The holding piece is injection molded of ABS in a multiple cavity cam-acting tool.

This embodiment allows displacement of connector parts during connection of misaligned parts on the order of 20 to 35 thousandths of an inch (0.50 to 0.89 millimeters).

Although the present invention is described and illustrated above with detailed reference to the preferred embodiment, the invention is not limited to the details of such embodiment but is capable of numerous modifications within the scope of the appended claims.

I claim:

1. A two-piece connector for detachable connection of first and second structural members through abutting surfaces of the members, said connector comprising:
   (a) A pin for partial insertion in a bore hole in the first structural member along an axis perpendicular to the abutting surface of the first member, said pin having a head on one end, an insertion shank for insertion in the bore hole in the first member on the other end, and a neck of lesser diameter than the head between the head and the insertion shank; and
   (b) a holding piece for insertion in the second structural member along an axis parallel to the abutting surfaces of the structural members in a bore hole in the second member communicating with the abutting surface of the second member, said holding piece having a recess to accept the head and neck of the pin, the walls of said recess defining an arcuate portion comprising a substantially semicircular opening in the holding piece of substantially the same diameter as the neck of the pin with rounded surfaces spaced apart a distance slightly narrower than the neck of the pin to form a constriction at the entrance of the recess to removably capture the neck of the pin.

2. A two-piece connector for detachable connection of first and second structural members through abutting surfaces of the members, said connector comprising:
   (a) A pin for partial insertion in a bore hole in the first structural member along an axis perpendicular to the abutting surface of the first member; and
   (b) A holding piece for insertion in the second structural member along an axis parallel to the abutting surface of the second structural member in a bore hole in the second member communicating with the abutting surface of the second member, said holding piece having a recess of substantially the same width as the portion of the pin received therein to snugly accept a portion of the pin, and annular fins to engage the wall of the bore hole in the second member and permit limited lateral displacement of the holding piece up to at least twenty thousanths of an inch while retaining the holding piece in the bore hole in the second member.

3. A two-piece connector according to claim 1, wherein the holding piece has annular fins to engage the wall of the bore hole in the second member and permit limited lateral displacement of the holding piece up to at least twenty thousandths of an inch perpendicular to the axis of the holding piece while retaining the holding piece in said bore hole in the second member.

4. A two-piece connector according to claim 3, wherein the pin has a radial shoulder between the neck and the insertion shank to limit the depth of insertion of the pin into the bore hole in the first structural member.

5. A two-piece connector according to claim 4, wherein the holding piece has a flange to limit the depth of insertion of the holding piece into the bore hole in the second structural member.

6. A two-piece connector according to claim 5, wherein the insertion shank of the pin has annular fins of lesser diameter than the radial shoulder to engage the wall of the bore hole in the first structural member.

7. A two-piece connector according to claim 6, said recess further having camming surfaces to engage said portion of the pin during the mating of the connector parts, to displace the holding piece toward the abutting surfaces as the pin follows said camming surfaces of the recess.

8. A two-piece connector according to claim 6, wherein the walls of the recess in the holding piece are further defined by a U-shaped cavity to receive and be substantially occupied by the head of the pin, said cavity having obliquely sloping walls adjacent to the arcuate portion to engage the head of the pin and, upon sliding movement of the abutting surfaces during mating of the connector parts, to displace the holding piece toward the abutting surfaces as the pin head follows the obliquely sloping surfaces of the cavity.

9. A two-piece connector according to claim 8, wherein the holding piece has an outside surface provided with flattened face operable to lie coplanar with the abutting surface of the second structural member when the connector parts are joined.

10. A two-piece connector according to claim 9, wherein the recess in the holding piece is further defined by a U-shaped channel in the flattened face of the holding piece to receive the radial shoulder of the pin, said channel having substantially parallel walls spaced apart a distance substantially equal to or greater than the diameter of the radial shoulder and of depth substantially equal to the thickness of the radial shoulder.

11. A two-piece connector according to claim 10, wherein the holding piece is made of plastic material.

12. A two-piece connector according to claim 11, wherein the pin is made of metal.

13. A two-piece connector according to claim 11, wherein the pin is made of plastic material.

14. A two-piece connector for detachable connection of first and second structural members through abutting surfaces of the members, said connector comprising:
   (a) a pin for partial insertion in a bore hole in the first structural member along an axis perpendicular to the abutting surface of the first member, said pin having a head on one end, an insertion shank having annular fins to engage the wall of the bore hole in the first member on the other end, a radial shoulder of greater diameter than the annular fins adjacent to the insertion shank to limit the depth of insertion of the pin into the bore hole in the first member, and a neck of lesser diameter than the head between the head and the radial shoulder; and
   (b) a holding piece for insertion in the second structural member along an axis parallel to the abutting surface of the second structural member in a bore hole in the second member communicating with the abutting surface of the second member, said holding piece having:
      (i) an outside surface provided with:
         (v) a flattened face operable to lie coplanar with the abutting surface of the second structural member when the connector parts are joined; and
         (w) annular fins to engage the walls of the bore hole in the second member and permit limited lateral displacement of the holding piece up to at least twenty thousandths of an inch perpendicular to the axis of the holding piece while retaining the holding piece in the bore hole in the second member; and
      (ii) a recess to snugly accept the radial shoulder, neck and head of the pin defined by:
         (x) a U-shaped channel in the flattened face of the holding piece to receive the radial shoulder, said channel having substantially parallel walls spaced apart a distance substantially equal to the diameter of the radial shoulder and a depth substantially equal to the thickness of the radial shoulder;
         (y) an arcuate portion comprising a substantially semi-circular opening in the holding piece of substantially the same diameter as the neck of the pin with rounded surfaces spaced apart a distance slightly narrower than the neck of the pin to form a constriction at the entrance of the recess to removably capture the neck of the pin; and
         (z) a U-shaped cavity of substantially the same width as the head of the pin to snugly receive and be substantially occupied by the head of the pin, said cavity having obliquely sloping walls adjacent to the arcuate portion to engage the head of the pin and, upon sliding movement of the abutting surfaces during mating of the connector parts, to displace the holding piece toward the abutting surfaces as the pin head follows the obliquely sloping walls of the cavity.

* * * * *